United States Patent [19]

Allums

[11] 4,033,041
[45] July 5, 1977

[54] STEEL LINE MEASURE GUIDE

[76] Inventor: John Henry Allums, 4206 Northwood, Anchorage, Alaska 99503

[22] Filed: May 12, 1975

[21] Appl. No.: 576,880

[52] U.S. Cl. .............................. 33/137 R; 33/138
[51] Int. Cl.² .......................................... G01B 3/10
[58] Field of Search ......................... 33/137 R, 138

[56] References Cited
UNITED STATES PATENTS

| | | | |
|---|---|---|---|
| 2,544,908 | 3/1951 | Winston | 33/138 |
| 2,581,858 | 1/1952 | Hilt et al. | 33/137 R |
| 2,629,934 | 3/1953 | Scott | 33/137 R |

Primary Examiner—Steven L. Stephan

[57] ABSTRACT

This device consists primarily of a pair of components having securement means for a measuring tape in order to quickly and accurately measure drill pipe, such as those in derricks or elsewhere, the device including a tape reel receptacle and a turnbuckle for holding it in place.

1 Claim, 19 Drawing Figures

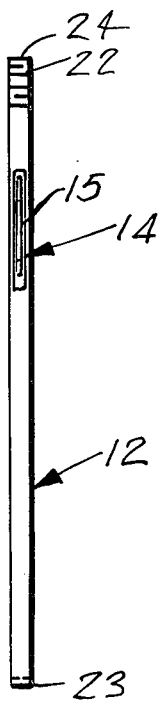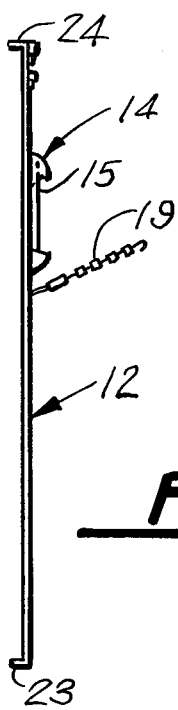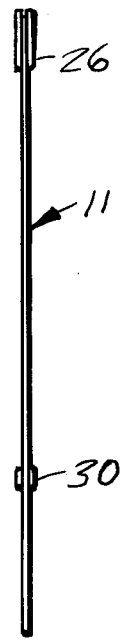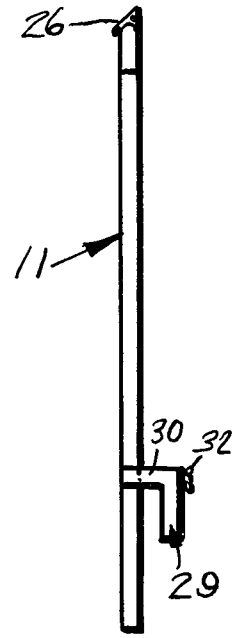
FIG.1  FIG.2  FIG.3  FIG.4
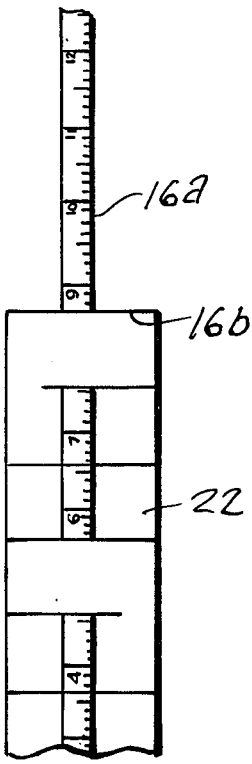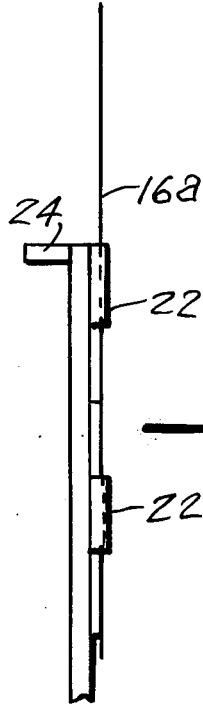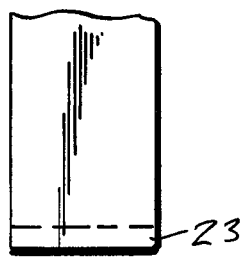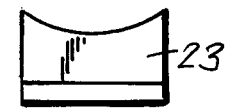
FIG.5  FIG.6  FIG.7  FIG.8  FIG.9  FIG.10

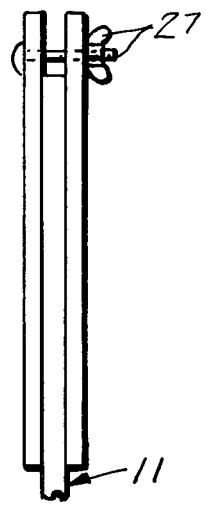
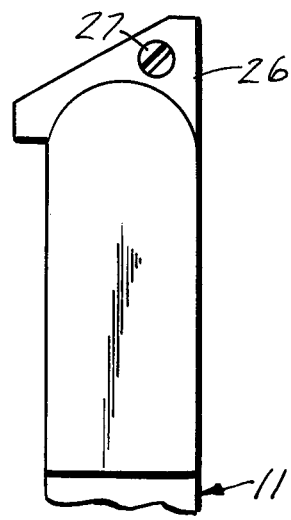
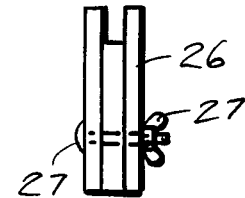
FIG.11  FIG.12  FIG.13
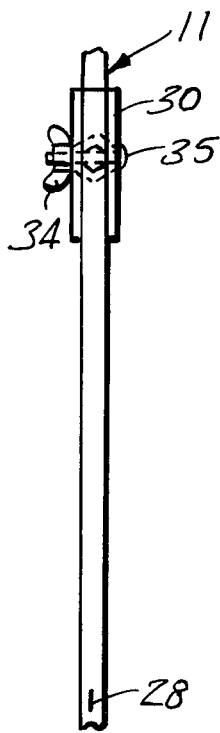
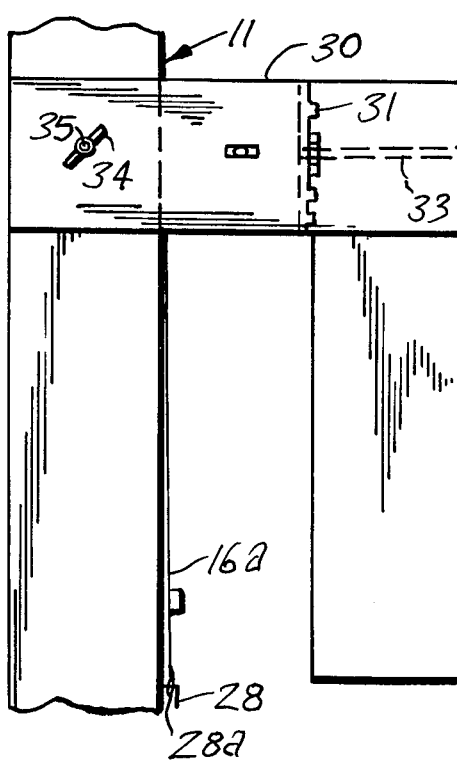
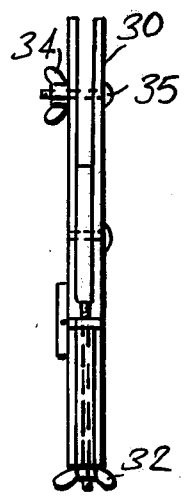
FIG.14  FIG.15  FIG.16

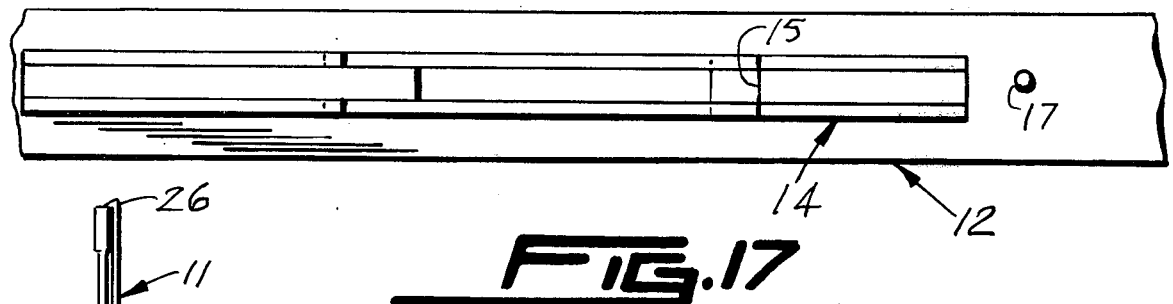
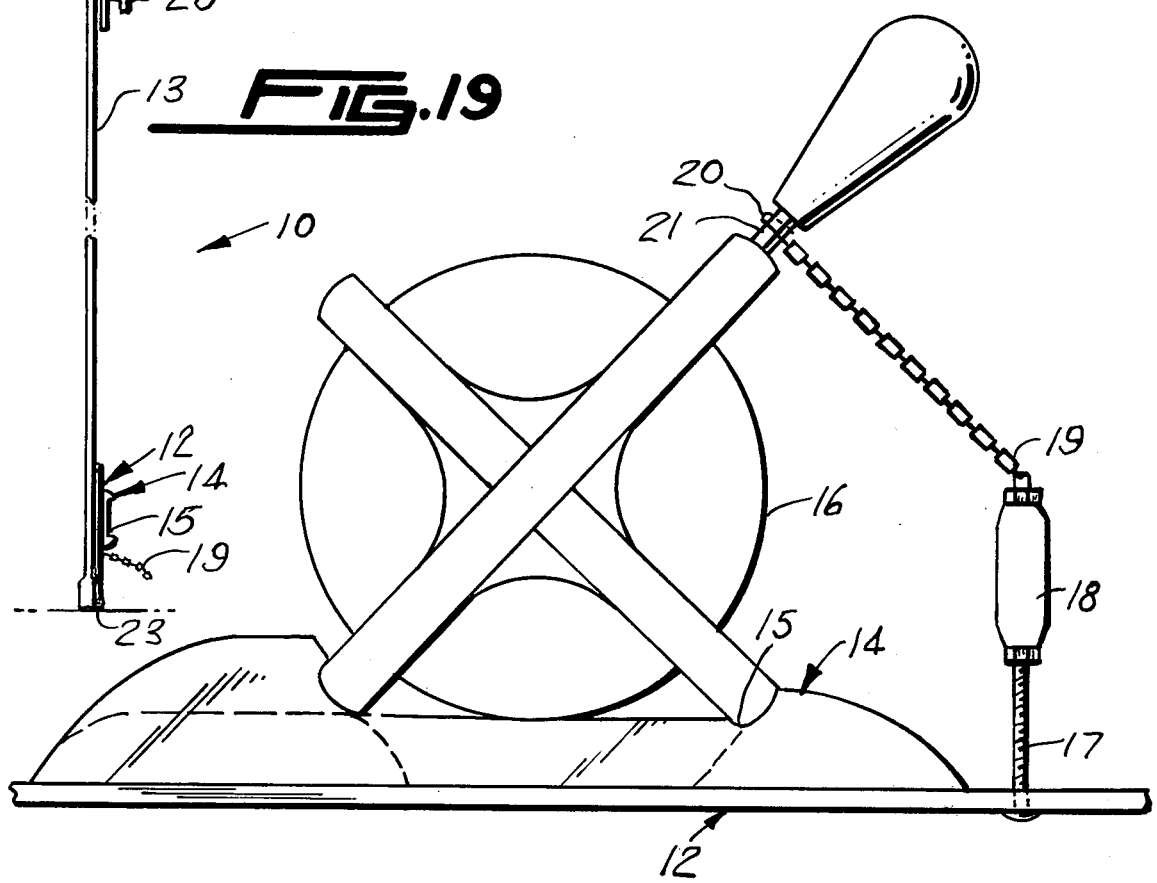

STEEL LINE MEASURE GUIDE

This invention relates to measuring devices and more particularly to a steel line measure guide.

It is therefore the principal object of this invention to provide a steel line measure guide which will provide a means of measuring the length of pipe standing upright without the necessity of a tape at the point where the pipe touches the floor.

Another object of this invention is to provide a line measure guide which is of such structure so as to be primarily used in measuring drill pipe standing in the derrick, however, its use is not limited to pipe standing in the derrick.

Another object of this invention is to provide a line measure guide which will be used where accuracy in measurement is extremely important and the device enables anyone to read a tape because you may stand and read it at eye level.

Still another object of this invention is to provide a line measure guide of the type described which will enable one man to control the bottom section and read the tape, thus saving approximately 30 to 35 minutes of rig time while strapping in or out of the hole which will free one man for other chores.

A further object of this invention is to provide a line measure guide of the type described which will utilize the standard 100 foot derrick tape which the user will already have available.

Other objects of the invention are to provide a steel line measure guide which is simple in design, inexpensive to manufacture, rugged in construction, easy to use and efficient in operation.

These and other objects will become readily evident upon a study of the following specification together with the accompanying drawings wherein:

FIG. 1 is a diagrammatic front view of one of the main components of the present invention shown in elevation;

FIG. 2 is a side view of FIG. 1;

FIG. 3 is a diagrammatic front view of the other main component of the invention; shown in elevation;

FIG. 4 is a side view of FIG. 3;

FIG. 5 is an enlarged fragmentary front view of the scale portion of the invention shown in elevation;

FIG. 6 is a side view of FIG. 5;

FIG. 7 is a front view of the steel line guide lip component portion;

FIG. 8 is a side view of FIG. 7;

FIG. 9 is a top view of FIG. 5;

FIG. 10 is a top view of FIG. 7;

FIG. 11 is a front view of FIG. 12 shown in elevation;

FIG. 12 is a fragmentary and enlarged view of the upper portion of FIG. 4;

FIG. 13 is a top view of FIG. 11;

FIG. 14 is an enlarged fragmentary view of the lower portion of FIG. 3;

FIG. 15 is a side view of FIG. 14;

FIG. 16 is a rear view of FIG. 14;

FIG. 17 is an enlarged fragmentary view of the upper portion of FIG. 1;

FIG. 18 is a side view of FIG. 17 showing a turnbuckle and chain in place thereon; and FIG. 19 is a vertical and diagrammatic view of an existing pipe in a derrick showing the device in use.

According to this invention, a steel line measure guide 10 is shown to include an elongated upper member 11, an elongated lower member 12 and the pipe 13 to be measured as will be more readily seen in FIG. 19 of the drawings. To the lower member 12 is secured fixedly in a suitable manner a tape reel receptacle 14 having a recessed portion 15 for receiving the tape reel 16 containing tape 16a which will be read at 16b as shown on FIG. 5 of the drawings. A threaded bolt fastener 17 extends outwards from lower member 12 and is received upon a turnbuckle 18 to which is attached a chain 19 having a hook 20 for engaging the handle 21 of tape reel 16. The guides 22 provide guide receiving means for the tape 16a and a lip portion 23 of lower member 12 serves to engage the end of lower pipe 13. The lip portion 24 at the opposite end of member 12 is arcuately curved in the same manner as lip 23 for engaging the outer periphery of pipe 13.

The lip portion 26 is secured to member 11 by means of a wing nut and bolt combination 27 and member 11 is provided with an extending hook 28 for receiving the eye 28a of tape 16a. The handle portion 29 of member 11 is secured to member 30 by the hinge portion 32 and the bolt fastener 33 enabling the securement of steel tape 16a between the traveling block and body of the tool. The members 30 are secured to member 11 by means of winged nut fastener 34 and bolt fastener 35.

The steel tape 16a goes over the top of the lip portion 26 of member 11 and hooks on the hook 28 near the bottom, thus leaving the 5 foot 6 inch or 5.5 mark exactly at the one-half inch off-set. The steel tape 16a is slipped into the guide members 22, after which the tape reel 15 is placed into the receptacle 14. The turnbuckle 18 is then tightened so as to hold it in place. Each measurement is read, plus 5 foot 6 inches from the end at the area 16b.

While various changes may be made in the detailed construction of the present invention, it is understood that such changes will be within the spirit and scope of the invention as is defined by the appended claims.

What I now claim is:

1. A device for use with a measuring tape to aid in measuring a length of pipe, comprising in combination, an elongated lower member and an elongated upper member, said lower member having a receptacle which is adapted to receive a measuring tape reel, means to hold said tape reel in said receptacle including in series, a bolt, a turnbuckle, a chain and a hook that engages a handle of the tape reel to hold the reel in the receptacle, the lower end of said lower member having a lip that engages the lower end of a pipe to be measured to hold said lower member at the lower end of the pipe, the upper end of said lower member having a second lip for engaging the side of said pipe and a plurality of guides for receiving said tape and guiding it towards said upper member, said upper member having means to attach said tape to the upper end of the pipe, said upper member having means to hold said tape wrapped around the upper end thereof a predetermined distance, said predetermined distance being equal to the distance from the uppermost of said guides to the lower end of said lower member, so that said uppermost guide also serves as a measuring readout indicator.

* * * * *